HOT WATER HEATER

Original Filed Aug. 19, 1968 2 Sheets-Sheet 1

INVENTOR
MERL J. KIMMELL

Emory L. Groff
ATTORNEYS

HOT WATER HEATER

Original Filed Aug. 19, 1968 2 Sheets-Sheet 2

INVENTOR
MERL J. KIMMEL

Emery L. Groff
ATTORNEYS

United States Patent Office

Re. 28,175
Reissued Sept. 24, 1974

28,175
HOT WATER HEATER

Merle J. Kimmel, Mishawaka, Ind., assignor to La Salle-Deitch Company, Inc., Elkhart, Ind.

Original No. 3,527,260, dated Sept. 8, 1970, Ser. No. 753,657, Aug. 19, 1968. Application for reissue Oct. 12, 1971, Ser. No. 188,522
Int. Cl. F22b *7/00*
U.S. Cl. 122—136 R 13 Claims

Matter enclosed in heavy brackets [ ] appears in the original patent but forms no part of this reissue specification; matter printed in italics indicates the additions made by reissue.

ABSTRACT OF THE DISCLOSURE

A water heater having an elongated water tank provided with a longitudinal heat exchanger tube extending the substantial length of the tank and including a combustion chamber therein defined by a baffle. A sealed vent assembly provides separate flue and combustion air chambers communicating with the heat exchanger tube and combustion chamber, respectively. Electrical elements provide independent water heating means.

This invention relates generally to a heating apparatus and more particularly to a device specifically adapted to provide hot water.

In the outfitting of travel or mobile homes a need exists for the provision of a compact yet highly efficient means for providing a supply of hot water. Such a device must necessarily be of a small size in view of the relatively limited space available in this environment, and at the same time must permit ready installation within the enclosure. In the case of a gas-fired heater adequate means must be provided to insure fresh air inlet and exhaust gas venting without necessitating special modification of the enclosure walls and without any bulky assembly protruding from the outside of the enclosure wall.

By the present invention a novel arrangement is offered comprising a substantially cylindrical water tank which is fully encapsulated within a lightweight insulating medium providing a smooth exterior surface lending itself to any conventional finish such as by painting. An improved heat exchanger construction is included having a specially designed baffle therein defining a highly efficient combustion chamber. A combined flue duct and combustion air chamber cooperate with the heat exchanger tube and flame combustion chamber to admit fresh air from the atmosphere and to vent flue gases thereto from a point substantially flush with the exterior of the enclosure wall, all of the foregoing structure providing an extremely compact arrangement readily mounted through a wall construction. So that users of the present device may benefit from the availability of electricity now provided at most mobile home parks, independent electrical heating means are included in the water tank.

Accordingly, one of the objects of the present invention is to provide a hot water heater including a water tank fully encapsulated within an insulating medium and having a unique gas-fired combustion chamber.

A further object of the present invention is to provide a hot water heater assembly including an improved combustion chamber defined by a baffle disposed within a heat exchanger tube positioned within a water tank.

Another object of the present invention is to provide a hot water heater having alternate water heating means, namely a gas-fired chamber and electrical immersion means, each operative independently of the other.

Still another object of the present invention is to provide a hot water heater including a horizontally disposed heat exchanger tube having a combustion chamber therein and having improved flue venting and air inlet means communicating directly with an open end of the heat exchanger tube and the adjacent open end of the combustion chamber, respectively.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawings, in which.

Similar reference characters designate corresponding parts throughout the several figures of the drawings.

Figure 1:
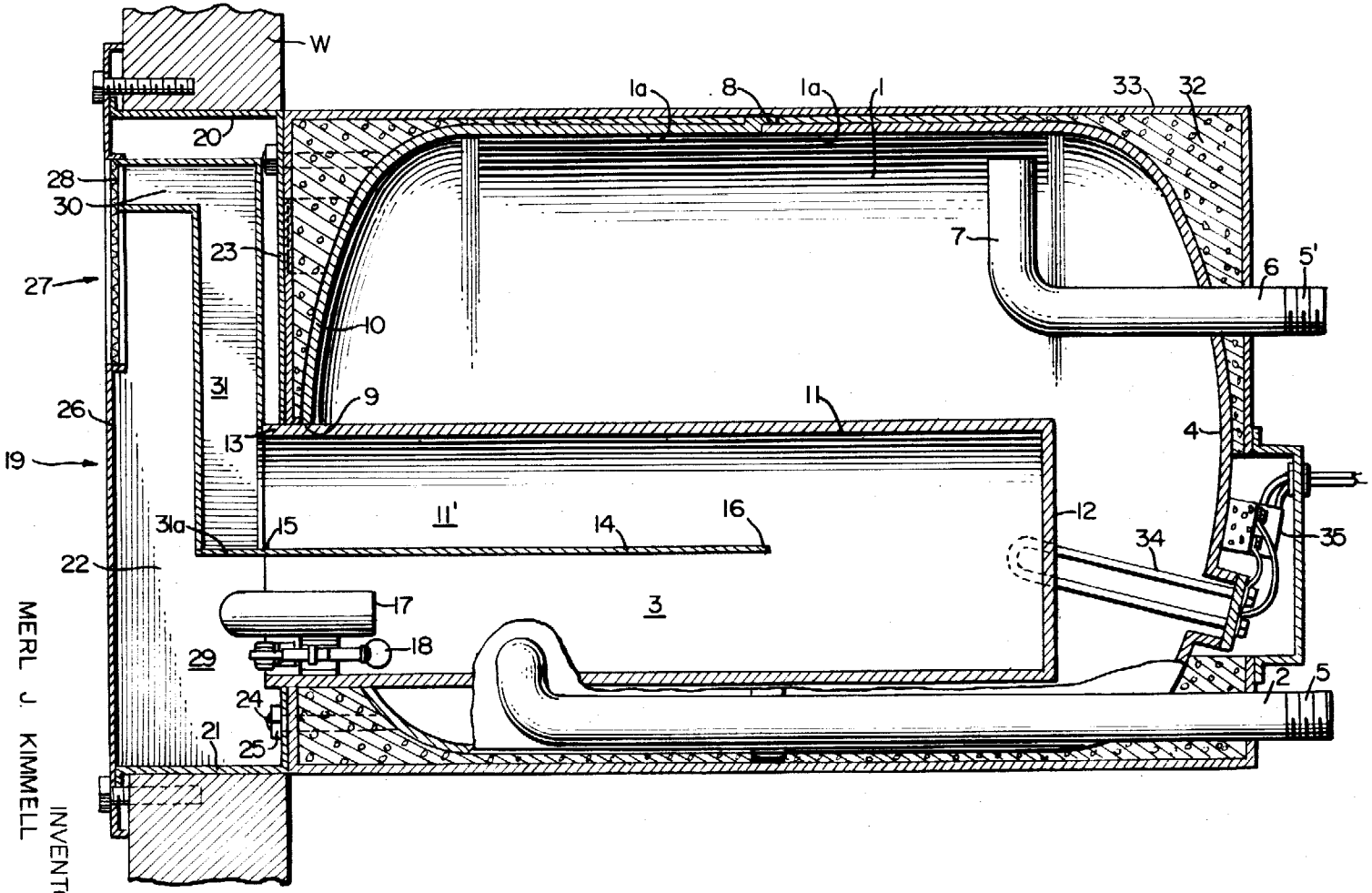
FIG. 1 is a longitudinal vertical sectional view of a hot water heater according to the present invention, taken along the line 1—1 of FIG. 2.

Referring now to the drawings, particularly FIG. 1, the hot water heater according to the present invention will be seen to comprise a water tank generally designated 1 and which comprises an elongated generally cylindrical metallic member. Cold water is supplied to the tank 1 by means of a cold water inlet pipe 2 which enters the tank 1 at a point intermediate the length of the combustion chamber 3 and which is preferably below the center line of this combustion chamber. For ease of installation and maintenance, the cold water inlet pipe 2 preferably extends toward the rear 4 of the water tank 1 whereupon the free end thereof is provided with conventional pipe threads 5. Disposed through the rear wall 4 of the tank 1 is a hot water outlet pipe 6 which includes an upturned leg 7 having its free open end disposed just below the top wall of the tank 1 as shown in FIG. 1. Suitable pipe threads 5' are likewise provided on the opposite end of the hot water outlet pipe 6. The water tank 1 is preferably constructed of two half sections 1a—1a which are sealed as at 8 by any suitable means such as welding. The sections 1a will thus be understood to be symmetrical and the only modification to the rearmost section 1a is the provision of an opening to admit the hot water outlet pipe 6. The forwardmost half section 1a, on the other hand, is provided with a cylindrical opening 9 disposed in the lower portion of the forward wall 10 of this half section.

Disposed through the opening 9 in the wall 10 is a longitudinal cylindrical heat exchanger tube 11 which tube will be seen to be closed at its inner or rear end by a vertical wall 12 which is spaced a relatively short distance from the rear wall 4 of the water tank 1. The forward portion of the tube 11 is attached by any suitable means (not shown) to the forward wall 10 to provide a water-tight joint therewith. This heat exchanger tube 11 is mounted within the water tank 1 so as to provide a forward extension 13 projecting outwardly a substantial distance from the wall 10 of the tank for reasons which will become apparent hereinafter.

Extending from the forward edges 13 of the heat exchanger tube 11 to a point spaced from the rear wall 12 thereof is an imperforate baffle 14 which comprises a planar member disposed in a horizontal plane. The front edge 15 of the baffle 14 is positioned substantially along the medial plane of the cylindrical tube 11 and thus will be seen to bisect the tube 11 while the rear edge 16 thereof terminates at a point well spaced from the wall 12 yet at a point substantially past the midpoint of the tube 11. By the foregoing arrangement it will be understood that a combustion chamber 3 is provided below the baffle 14 which suddenly increases in area beyond the rear edge 16 of the baffle. The arrangement of the baffle 14 and the resultant semi-circular cross-sectional area of the passageway 11' enhances the exit of the flue gases from the tube 11. The heat from the burner 17 impinging upon the baffle 14 will accelerate the flow of gasses along the lower level within the area 11' while the diminishing transverse area toward the top of this passageway causes an accelerated gas flow in the upper level to urge all flue gasses toward the front 13 of the tube 11.

A suitable gas burner tube 17 is axially disposed within the forward portion of the combustion chamber 3 and includes a conventional gas pilot burner 18 mounted adjacent thereto. By the arrangement of the baffle 14 the heated products of combustion generated upon ignition of the burner tube 17 will be assisted in their movement toward the rear wall 12 of the heat exchanger tube 11 and these rising gases upon passing the rear edge 16 of the baffle will thence be directed forwardly past the edge 16 and into the flue passageway 11' above the baffle 14.

The above described tank and burner assembly is adapted to be mounted flush with the inner surface of an enclosure wall W. In this respect the wall W is provided with a rectangular through-opening into which is positioned a casing, generally designated 19, having top, bottom, side and rear walls 20, 21, 22 and 23, respectively. All of these casing walls, except the rear wall 23, will be understood to be imperforate, thus providing a complete fireproof protection for the wall opening. The rear wall 23 of the casing is provided with a circular opening mating with the outwardly projecting forward extension 13 of the heat exchanger tube 11 as will be seen in FIG. 1 of the drawings. With the casing 19 securely positioned within the opening in the wall W by any suitable means it will be readily apparent that the water tank and burner assembly may be anchored into its operative position by means of the studs 24 which project forwardly from the front wall 10 of the tank 1 and pass through suitable openings in the rear wall 23, being retained in position by means of the nuts 25.

Figure 2:
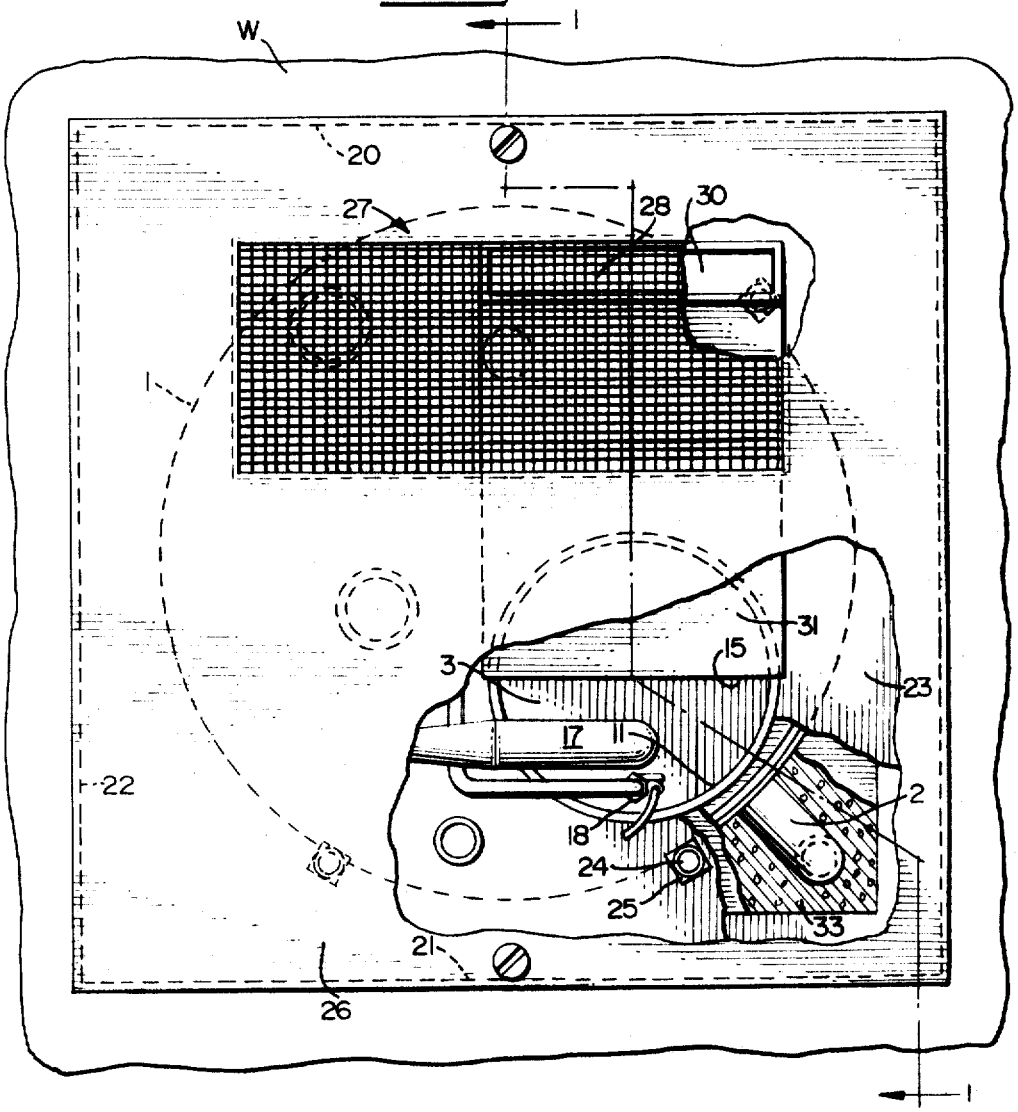
FIG. 2 is an end elevation of the hot water heater according to the present invention, with portions removed for clarity.

The front of the casing 19 is enclosed by a planar access door 26 which is imperforate except for a transverse opening 27. The majority of this opening 27 serves as a combustion air inlet and communicates directly with the interior of the casing 19 which serves as a combustion air chamber 29. The upper portion 28 of the opening 27 through the access door 26 serves as a flue-gas vent and connects directly with a horizontal flue chamber 30 which extends rearwardly to a point short of the casing rear wall 23 and thence downwardly to provide a vertical flue chamber 31 having its lower terminus 31a coplanar with the forward edge 15 of the baffle 14. From a review of FIG. 2 of the drawings, it will be seen that the lateral extent of the horizontal flue chamber 30 as well as the upper portion 28 of the opening 27 may quite obviously correspond to the lateral extent of the lower portion of the opening 27; however at least that much of the lower portion of the vertical flue chamber 31 that overlies the front of the forward extension 13 of the heat exchanger tube should be no wider than the corresponding underlying dimension of the heat exchanger tube at this point in order to obtain the most desirable draft conditions for the products of combustion as they leave the tube 11 above the front edge 15 of the baffle 14. From the foregoing description it will be seen that the proposed arrangement provides for the maximum unobstructed air flow leading from the combustion air inlet 27 to the semi-circular opening between the combustion air chamber 29 and the forward portion of the combustion chamber 3, while at the same time provides an unobstructed semi-circular opening between the forward edge of the heat exchanger tube in the area above the baffle 14. Radiation from the heated flue chambers into the interior of the enclosure is precluded by the spacing the rear wall of the vertical flue chamber 31 and the top wall of the horizontal flue chamber 30 a sufficient distance from the adjacent casing walls to provide for circulation of air from the combustion air chamber 29 therebetween, thus providing sufficient insulation. By positioning the vertical flue chamber 31 toward the rear of the casing, the likelihood of radiant heat from this chamber affecting the incoming cooler air entering through the inlet 27 is reduced. Also, by providing the inlet 27 at a point spaced well above the burner 17 it will be seen that the chance of a flame blow-out under high wind conditions is substantially minimized.

The description set forth above will enable one skilled in the art to readily understand the construction of the present invention as it applies to the water tank, burner and heat exchange assembly and the venting assembly. To enhance not only the handling of the present invention but also the installation and utilization thereof, it is proposed to fully encapsulate the water tank 1 with a specific type of insulation medium, generally designated 32. This insulation is preferably of the expanded foam type, such as polyurethane, and is applied by foaming in place about the entire exterior of the water tank 1. The exterior configuration of the insulating medium 32 is preferably designed as a rectangular cube and the outer surfaces thereof are densified by a well known method to provide a smooth outer layer 33 which may readily be painted or otherwise finished. From a review of FIG. 1, it will be seen that the insulating medium 32 and its densified outer surface 33 completely encapsulate the water tank 1 and the only portions thereof projecting outwardly from the insulation are the water pipes 2 and 6 and the forward extension 13 of the heat exchanger tube 11.

In order to enable an operator of the present device to utilize electrical current should it be available, a suitable electric heating element 34 is disposed through the rear wall 4 of the tank 1 and is provided with a thermostat 35.

I claim:

1. In a heater, an elongated horizontal heat exchanger tube closed at one end and having an opening at the other end, a baffle disposed within said tube extending from said open end to a point short of said closed end, burner means within said tube adjacent said open end between said baffle and the bottom of said tube, venting means adjacent said open end of said tube including, a combustion air chamber communicating on the one hand with the atmosphere and on the other hand with the open end of said tube between said baffle and the bottom of said tube, a flue chamber communicating at its lower end with the open end of said tube between said baffle and the top of said tube and at its upper end with the atmosphere, a casing enclosing said venting means, said casing including an access door, and top, bottom, rear and side walls, the open end of said tube projecting through the lower portion of said rear wall, said access door provided with *opening means therein including relatively upper and lower portions* [an opening in the upper portion thereof], said flue chamber extending vertically from said tube opening to *a point adjacent the upper portion of said access door opening means* [the top portion of said access door opening], and said combustion air chamber occupying *substantially* the remainder of the interior of said casing and communicating with the atmosphere through the lower portion of said access door opening *means*.

2. A heater according to claim 1, wherein said baffle is horizontal and parallel to the top and bottom of said tube.

3. A heater according to claim 2, wherein said tube is cylindrical in cross section and said baffle comprises a planar member.

4. A heater according to claim 1, wherein the cross sectional area of said tube open end juxtaposed said flue chamber is substantially equal to the cross sectional area of said tube open end juxtaposed said combustion air chamber.

5. A heater according to claim 3, wherein the forward edge of said baffle substantially bisects the open end of said tube.

6. A heater according to claim 2, including a water tank enclosing all but the open end of said tube, a cold water inlet pipe entering said tank at a point adjacent the lower surface of said tube, and a hot water outlet pipe disposed through said tank with its inner end adjacent the top of said tank.

7. A heater according to claim 6 including electrical heating means connected with said water tank.

8. In a heater, an elongated horizontal heat exchanger tube closed at one end and having an opening at the other end, a baffle disposed within said tube extending from said open end to a point short of said closed end, burner means within said tube adjacent said open end between said baffle and the bottom of said tube, venting means adjacent said open end of said tube including, a combustion air chamber communicating on the one hand with the atmosphere and on the other with the open end of said tube between said baffle and the bottom of said tube, a flue chamber communicating at its lower end with the open end of said tube between said baffle and the top of said tube and at its upper end with the atmosphere, a water tank enclosing all but the open end of said tube, a cold water inlet pipe entering said tank at a point adjacent the lower surface of said tube, a hot water outlet pipe disposed through said tank with its inner end adjacent the top of said tank, and electrical heating means disposed within said water tank outside of said tube.

9. A heater according to claim 8, including an expanded foam insulation completely encapsulating said water tank.

10. In a heater, an elongated horizontal heat exchanger tube closed at one end and having an opening at the other end, a baffle disposed within said tube extending from said open end to a point short of said closed end, burner means within said tube adjacent said open end between said baffle and the bottom of said tube, venting means adjacent said open end of said tube including, a combustion air chamber communicating on the one hand with the atmosphere and on the other with the open end of said tube between said baffle and the bottom of said tube, a flue chamber communicating at its lower end with the open end of said tube between said baffle and the top of said tube and at its upper end with the atmosphere, a water tank enclosing all but the open end of said tube, a cold water inlet pipe entering said tank at a point adjacent the lower surface of said tube, a hot water outlet pipe disposed through said tank with its inner end adjacent the top of said tank, and electrical heating means connected with said water tank.

*11. A water heater of the type wherein an atmospheric burner is used to heat the water, comprising a liquid container having an opening in the wall thereof, an elongated immersion heater tube having open and closed ends thereon, inserted generally horizontally into the container and having the open end portion thereof connected to the wall of the container about the opening therein so that the opening is closed to the interior of the container while the bore of the tube is placed in communication with the exterior of the container therethrough, and forms an elongated gas flow chamber for heating the liquid in the container, a flat baffle inserted generally horizontally into the bore of the tube for a substantial distance along the length of the tube inwardly from the open end thereof, but terminating short of the closed end of the tube, so as to separate the lower and upper portions of the chamber for reentrant flow of the gases therethrough, a fuel burner arranged in communication with the lower portion of the chamber adjacent the open end portion of the tube so that the hot gases therefrom are fed along the bottom of the chamber in the direction of the closed end portion of the tube, and a flue the body of which is interconnected with the open end portion of the tube adjacent the upper portion of the chamber so that the hot gases therein are withdrawn along the top of the chamber in the direction of the open end portion of the tube.*

*12. A water heater of the type wherein an atmospheric burner is used to heat the water, comprising a liquid container having an opening in the wall thereof, an elongated immersion heater tube having open and closed ends thereon, inserted generally horizontally into the container and having the open end portion thereof connected to the wall of the container about the opening therein so that the opening is closed to the interior of the container while the bore of the tube is placed in communication with the exterior of the container therethrough, and forms an elongated gas flow chamber for heating the liquid in the container, a flat baffle inserted generally horizontally into the bore of the tube for a substantial distance along the length of the tube inwardly from the open end thereof, but terminating short of the closed end of the tube, so as to separate the lower and upper portions of the chamber for reentrant flow of the gases therethrough, a fuel burner arranged in communication with the lower portion of the chamber adjacent the open end portion of the tube so that the hot gases therefrom are fed along the bottom of the chamber in the direction of the closed end portion of the tube, and a flue interconnected with the open end portion of the tube adjacent the upper portion of the chamber so that the hot gases therein are withdrawn along the top of the chamber in the direction of the open end portion of the tube, the baffle extending from the bottom of the flue so as to form a septum between the burner and the mouth of the flue.*

*13. In a water heater of the type wherein an atmospheric burner is used to heat the water, a liquid container having an opening in the wall thereof, an elongated cylindrical immersion heater tube having open and closed ends thereon, inserted generally horizontally into the container and having the open end portion thereof connected to the wall of the container about the opening therein so that the opening is closed to the interior of the container while the bore of the tube is placed in communication with the exterior of the container therethrough, and forms an elongated gas flow chamber for heating the liquid in the container, and a flat baffle in the bore of the tube for a substantial distance along the length of the tube inwardly from the open end thereof, but terminating short of the closed end of the tube, so as to separate the lower and upper portions of the chamber for reentrant flow of the gases therethrough, said baffle being disposed substantially in the horizontal diametral plane of the tube and longitudinally supported therein.*

References Cited

The following references, cited by the Examiner, are of record in the patented file of this patent or the original patent.

UNITED STATES PATENTS

| | | | |
|---|---|---|---|
| 1,701,835 | 2/1929 | Cannon et al. | 127—149 |
| 2,146,565 | 2/1939 | Curtis | 122—149 |
| 2,729,200 | 1/1956 | Miller | 122—149 X |
| 2,737,175 | 3/1956 | Dunston | 126—360 |
| 3,028,843 | 4/1962 | Carlson et al. | 122—149 |
| 3,275,798 | 9/1966 | Martin | 122—13 X |

KENNETH W. SPRAGUE, Primary Examiner

U.S. Cl. X.R.

122—494; 126—360 R